(No Model.)

W. W. HOLMES.
POWER MECHANISM FOR CIRCULAR SAWS.

No. 511,269. Patented Dec. 19, 1893.

Witnesses:
Harry S. Arthur.
D. Darley.

Inventor:
William W. Holmes
By F. W. Ritter
Atty.

UNITED STATES PATENT OFFICE.

WILLIAM W. HOLMES, OF CHICAGO, ILLINOIS, ASSIGNOR TO THE Q. AND C. COMPANY, OF SAME PLACE.

POWER MECHANISM FOR CIRCULAR SAWS.

SPECIFICATION forming part of Letters Patent No. 511,269, dated December 19, 1893.

Application filed July 21, 1893. Serial No. 481,134. (No model.)

*To all whom it may concern:*

Be it known that I, WILLIAM W. HOLMES, a citizen of the United States, residing at Chicago, in the county of Cook, State of Illinois, have invented certain new and useful Improvements in Power Mechanism for Circular Saws and for Gearing Generally wherever Rotary Motion is to be Transmitted; and I hereby declare the following to be a full, clear, and exact description of the same, reference being had to the accompanying drawings, wherein—

Figure 1:
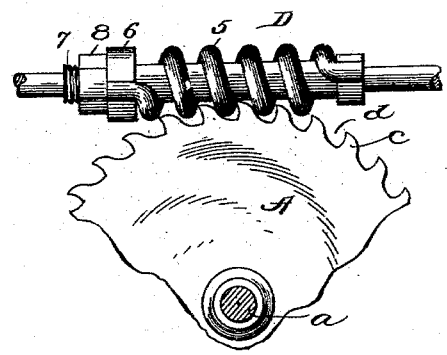
Figure 2:
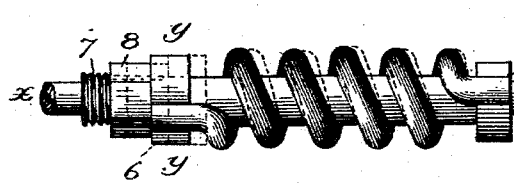
Figure 3:
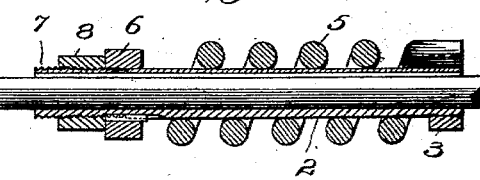
Figure 4:
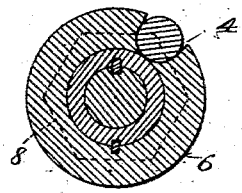
Figure 5:
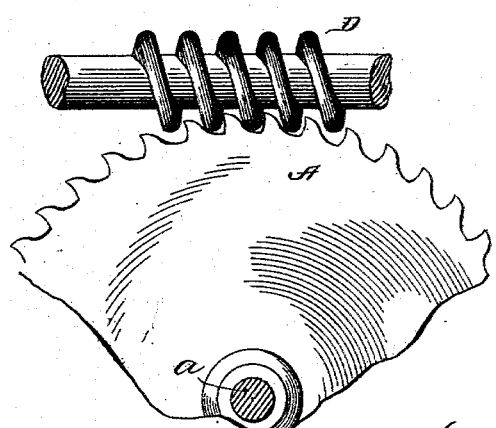

Figure 1 is an elevation of devices embodying all the features of my invention, as applied to direct driven circular saws. Fig. 2 is an enlarged detached view of the adjustable-pitch worm shown in Fig. 1. Fig. 3 is an enlarged longitudinal section of the shaft and adjustable-pitch worm shown in Fig. 1, on the line $x$—$x$. Fig. 4 is an enlarged transverse section thereof, on the line $y$—$y$, and Fig. 5 is a modification for direct driven circular saws.

Like symbols refer to like parts wherever they occur.

In the case of direct driven circular saws, or those wherein cog or lantern gearing mesh directly with the saw (by engaging in the throat of the saw-teeth, or in slots in the saw), experience has shown that the teeth are necessarily placed some distance apart—for clearance—and that the saw will jump or work irregularly where the material operated upon is thin—and especially is this the case in sawing metal. To overcome said objection and obtain a steady continuous, progressive motion of the saw through the material—whether thick or thin—is the first object I have in view, and this I have accomplished by the combination of a worm directly with the saw, and the same or its equivelent embodies the first feature of my invention. As an incident of this combination at least double the number of teeth may be used in any saw of a given diameter. A further, existing objection to direct driven saws as at present constructed, resides in the lost motion resulting from the wear of the teeth, &c., and the enlargement of the throat which also gives rise to jumping or irregular action of the saw, and necessitates a renewal and change of the driving gear, and the same difficulty would in the course of time result from the use of the worm. Therefore, to overcome said second objection, I construct an adjustable-pitch worm, which or its equivalent, embodies a second feature of my invention; and inasmuch as the adjustable-pitch worm is applicable, without further invention, to gearing generally where rotary motion is to be transmitted and slack from wear taken up therein, I do not herein limit this feature of my invention to use with circular saws.

There are other minor features of invention relating more especially to the construction and combination of parts, whereby the adjustable-pitch worm is obtained, and not necessarily limited to direct driven circular saws—all as will hereinafter more fully appear.

I will now proceed to describe my invention more fully, so that others skilled in the art to which it appertains, may apply the same.

In the drawings A indicates a section of a circular saw, (chosen for illustration) and mounted on a suitable arbor, as at $a$, provided with teeth $c$ having throats $d$, of any suitable shape which will permit the worm D to mesh with the saw, clear the front edge of the tooth, and work on the rear of the tooth.

D indicates the worm which meshes with the saw A, and which, for the main purpose of this invention, may be a solid cut worm, as illustrated in Fig. 5, of the drawings, but as a solid cut or cast worm would have to be re-cut or changed to vary the pitch and compensate for the wear of the saw teeth (or equivalent wheel) with which it geared, I prefer to employ an adjustable-pitch worm, which, may be, and preferably is, constructed as follows:—Upon a suitable shaft, is keyed a sleeve 2, so as to rotate with the shaft, said sleeve having at one end a fixed collar 3—attached to, and preferably forming part of the sleeve, said collar 3 being longitudinally slotted as at 4, for the reception of one end of a spiral spring worm-thread 5, which loosely encircles the sleeve 2. The other end of spiral spring worm-thread 5 is secured to a second or loose collar 6 adapted to slide longitudinally on sleeve 5 but preferably prevented from rotating on the sleeve, by means of a key or other suitable and well known device. The end of sleeve 5 adjacent to sliding collar 6 may be threaded for some distance as at 7 and a nut 8 placed thereon—or any equivalent means may be provided for compressing the spiral spring worm-thread 5 and changing its pitch.

The advantages arising from the use of a worm for direct driving rotary saws, whether said worm be solid (or fixed) or whether it be an adjustable-pitch worm are first the saw has a steady progressive movement in both thick and thin material, and does not jump or vibrate to the injury of both saws and frame; while the advantages arising from the adjustable-pitch worm—which advantages are the same whether said work be combined with a saw or other rotary wheel—are the ability to modify the pitch of the worm to compensate for wear and to maintain the continuous progressive motion of the parts and avoid jumping or back lashing in the machinery.

Having thus described my invention, what I claim, and desire to secure by Letters Patent, is—

1. The combination with a circular saw, of a driving worm which meshes with the teeth thereof; substantially as and for the purposes specified.

2. The combination with a rotary toothed disk, of an adjustable-pitch driving worm; substantially as and for the purposes specified.

3. The combination with a rotary toothed disk, of a compressible spring worm-thread; substantially as and for the purposes specified.

4. The combination with a rotary disk having worm recesses, of a spiral spring worm-thread having one end fixed, a sliding collar, and means for adjusting the sliding collar to change the pitch of the spring worm thread; substantially as and for the purposes specified.

5. The combination, of a shaft, a spiral spring worm-thread having one end secured to the shaft, a sliding collar to which the other end of the spiral spring worm-thread is secured, and means for adjusting the sliding collar; substantially as and for the purposes specified.

6. The combination, of a sleeve, a fixed collar, attached to one end of said sleeve a spiral spring worm-thread which encircles the sleeve and is secured at one end to the fixed collar, a sliding collar to which the other end of the spiral spring worm-thread is secured, and means for adjusting and securing the sliding collar; substantially as and for the purposes specified.

7. The combination of a shaft, a sleeve keyed thereon and threaded at one end, a collar fixed to the sleeve, a sliding collar, a spiral spring which encircles the sleeve and is secured to both collars, and a nut on the threaded end of the sleeve; substantially as and for the purposes specified.

In testimony whereof I affix my signature, in presence of two witnesses, this 19th day of July, 1893.

WILLIAM W. HOLMES.

Witnesses:
OSCAR SWANSON,
S. F. JOHNSON.